United States Patent
Linda et al.

(10) Patent No.: US 8,527,177 B2
(45) Date of Patent: Sep. 3, 2013

(54) SYSTEM FOR CONTROLLING A VEHICLE WITH DETERMINATION OF THE SPEED THEREOF RELATIVE TO THE GROUND

(75) Inventors: Jean-Louis Linda, La Tour-de-Treme (CH); Daniel Walser, Villars-sur-Glane (CH)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 442 days.

(21) Appl. No.: 12/739,875

(22) PCT Filed: Nov. 10, 2008

(86) PCT No.: PCT/EP2008/065191
§ 371 (c)(1),
(2), (4) Date: Jun. 28, 2010

(87) PCT Pub. No.: WO2009/060090
PCT Pub. Date: May 14, 2009

(65) Prior Publication Data
US 2010/0256887 A1    Oct. 7, 2010

(30) Foreign Application Priority Data
Nov. 9, 2007    (FR) .................................. 07 58945

(51) Int. Cl.
*G06F 7/00*    (2006.01)
*B60T 8/172*    (2006.01)

(52) U.S. Cl.
CPC .................................... *B60T 8/172* (2013.01)
USPC ............................................................. 701/74

(58) Field of Classification Search
USPC ........................................................... 701/74
See application file for complete search history.

(56) References Cited

U.S. PATENT DOCUMENTS

| | | | |
|---|---|---|---|
| 4,989,923 A * | 2/1991 | Lee et al. | 701/74 |
| 4,999,778 A | 3/1991 | Ruhl et al. | 364/426.02 |
| 5,082,333 A | 1/1992 | Fukushima et al. | 303/96 |
| 5,136,509 A | 8/1992 | Van Zanten et al. | 364/426.01 |
| 5,292,184 A | 3/1994 | Takata | 303/100 |
| 5,418,437 A | 5/1995 | Couture et al. | 318/139 |
| 5,419,624 A | 5/1995 | Adler et al. | 303/112 |
| 5,566,094 A | 10/1996 | Kojima et al. | 364/565 |
| 5,719,770 A | 2/1998 | Matsuno | 364/426.015 |
| 5,788,005 A | 8/1998 | Arai | 180/65.2 |
| 5,898,281 A | 4/1999 | Bossoney et al. | 318/52 |

(Continued)

FOREIGN PATENT DOCUMENTS

| | | |
|---|---|---|
| DE | 33 42 553 A1 | 6/1985 |
| DE | 37 31 075 A1 | 3/1989 |

(Continued)

*Primary Examiner* — Gerald McClain
(74) *Attorney, Agent, or Firm* — Fitzpatrick, Cella, Harper & Scinto

(57) ABSTRACT

A control system for controlling a vehicle includes a wheel speed indicator for each of at least two wheels of the vehicle, a vehicle speed indicator, and a processor programmed to include a validation unit. The validation unit performs a first test of a road grip condition of each wheel based on slip information of the vehicle. The vehicle speed indicator produces an instantaneous vehicle speed estimation based on at least one circumferential wheel speed indication ascertained by the validation unit of the processor.

19 Claims, 8 Drawing Sheets

(56) References Cited

U.S. PATENT DOCUMENTS

| | | | | |
|---|---|---|---|---|
| 5,913,240 A * | 6/1999 | Drahne et al. | | 73/146 |
| 6,015,192 A | 1/2000 | Fukumura | | 303/140 |
| 6,657,356 B2 | 12/2003 | Laurent et al. | | 310/254 |
| 6,662,898 B1 | 12/2003 | Mattson et al. | | 180/446 |
| 6,701,224 B1 | 3/2004 | Klusemann | | 701/1 |
| 6,709,075 B1 | 3/2004 | Crombez et al. | | 303/152 |
| 6,756,710 B2 | 6/2004 | Bourqui et al. | | 310/44 |
| 6,847,875 B2 | 1/2005 | Lu et al. | | 701/38 |
| 7,096,098 B2 | 8/2006 | Auguet et al. | | 701/22 |
| 7,222,007 B2 | 5/2007 | Xu et al. | | 701/38 |
| 7,292,925 B1 | 11/2007 | Watanabe et al. | | 701/70 |
| 2006/0015236 A1 | 1/2006 | Yamaguchi et al. | | 701/69 |
| 2008/0082246 A1 | 4/2008 | Brown et al. | | 701/91 |
| 2009/0234525 A1 | 9/2009 | Bourqui et al. | | 701/22 |
| 2009/0256415 A1 | 10/2009 | Bourqui et al. | | 303/3 |
| 2009/0272608 A1 | 11/2009 | Bourqui et al. | | 188/160 |
| 2010/0065386 A1 | 3/2010 | Bourqui | | 188/159 |

FOREIGN PATENT DOCUMENTS

| | | |
|---|---|---|
| DE | 41 34 831 A1 | 4/1993 |
| DE | 43 14 830 A1 | 11/1994 |
| DE | 195 27 531 A1 | 2/1996 |
| DE | 199 11 525 C1 | 9/2000 |
| DE | 100 41 204 A1 | 7/2001 |
| DE | 101 22 653 A1 | 7/2002 |
| DE | 102 60 416 A1 | 7/2004 |
| EP | 0 497 392 A1 | 8/1992 |
| EP | 0 786 369 A1 | 7/1997 |
| EP | 0 881 114 A2 | 12/1998 |
| EP | 1 210 256 B1 | 6/2002 |
| EP | 1 832 881 A2 | 9/2007 |
| FR | 2 624 070 A1 | 6/1989 |
| FR | 2 776 966 A1 | 10/1999 |
| FR | 2 871 889 A1 | 12/2005 |
| FR | 2 894 033 A1 | 6/2007 |
| GB | 2 344 799 A | 6/2000 |
| GB | 2 383 567 A | 7/2003 |
| GB | 24 09 914 A | 7/2005 |
| WO | WO 01/76902 A1 | 10/2001 |
| WO | WO 03/065546 A2 | 8/2003 |
| WO | WO 2007/107576 A1 | 9/2007 |

* cited by examiner

SYSTEM FOR CONTROLLING A VEHICLE WITH DETERMINATION OF THE SPEED THEREOF RELATIVE TO THE GROUND

FIELD OF THE INVENTION

The present invention relates to land vehicles, in particular road vehicles. It targets in particular the techniques for controlling such vehicles and the determination of their speed relative to the ground for this purpose, in order to adjust the parameters that determine this behaviour and improve running conditions and safety. It is particularly well suited to the case where the movement of the vehicle on the ground is controlled by one or more specific electric machines coupled to a driving wheel to apply to it a driving torque or braking torque according to requirements.

STATE OF THE ART

Electric vehicle proposals have progressed a great deal in recent years. The U.S. Pat. No. 5,418,437 can, for example, be cited which describes a four-wheel vehicle, of series hybrid type, each wheel being driven by an electric machine that is specific to it, a controller making it possible to control the motors incorporated in the wheel and handling the management of the energy supply to the motors from an alternator or from a battery. When the energy supply is interrupted, the movement of the wheel under the action of the inertia of the vehicle can in turn drive the electric machine and enable it to operate as a generator to an electric load by then applying a so-called regenerative braking torque to that wheel.

This patent remains silent on the management of the electric braking that is obtained, but the state of the art does contain examples of such management to complement the conventional friction-based mechanical braking controls. Thus, for example, the patent application published in the United Kingdom under the reference GB 2344799 describes a vehicle capable of generating several regenerative braking power levels from electric traction motors, so as to supply a function simulating the braking by compression or engine braking that is normally available with internal combustion engines, in addition to the traditional mechanical braking function.

Generally, it has already been proposed to use the facility offered by an electric machine on board a vehicle to flexibly and accurately control the torque applied to a wheel of a vehicle that is equipped therewith. Such a possibility has, for example, been used with the wheel anti-lock systems. The U.S. Pat. No. 6,709,075 describes a vehicle equipped with an electric motor traction system. A braking function deriving from the operation of this motor as a generator can be added to the friction braking torque applied to each wheel as a function of its behaviour as determined from an ABS system (antilock braking system) with which the vehicle is equipped. Arrangements are made to prevent the regenerative braking from interfering with the correct operation of the ABS system for the regulation of the friction braking.

This facility for accurately controlling the torque applied to a wheel is, more generally, well suited to stability control systems, by the modulation of the braking torque alone or together with that of the engine torque. The PCT patent application published under the reference WO 01/76902 describes a vehicle propulsion and braking system in which each wheel likely to be driven by an internal combustion engine is also coupled to an electric machine capable of selectively applying to it an additional engine torque or a braking torque as a function of the controls of a vehicle stability control system that operates in response to a yaw sensor.

Finally, the patent application published in the United Kingdom under the reference GB 2 383 567 also describes a system in which an electric machine is provided to supply a torque to certain wheels of a vehicle provided with an internal combustion engine. The level of this additional torque is modulated as a function of data supplied by a yaw sensor.

Thus, it is well known to use the engine or braking torque supplied by an electric machine to adjust the forces applied to the wheels of a vehicle by an internal combustion engine. It is also known to use the torque produced by such a machine to adapt the friction braking forces applied to the wheels of an electric traction vehicle.

In the preceding two examples, a yaw sensor is used on board the vehicle to determine the torque level to be applied or to be added to certain wheels of the vehicle to obtain the desired behavioural effects. Other parameters can be measured and used for this purpose. The European patent application EP 0 881 114 presents a control system for vehicles with four wheels each coupled to an independent electric motor, capable of applying an engine or braking torque to each of the wheels, whether guiding or not. A conventional disc brake system is also provided and a steering angle sensor makes it possible to know the orientation of the guiding wheels at each instant. Each wheel motor is equipped with a wheel speed sensor. An indication of the speed of the vehicle relative to the ground is obtained by the system's control unit by combining the information obtained from the signals from the wheel sensors. It is indicated (without more detail) that this indication can be specified using information obtained from on board accelerometers and from a satellite navigation system. The system's control unit continually follows the torque level applied to each wheel, the speed and the steering angle of that wheel, and the estimated ground speed of the vehicle. It also calculates the yaw rate and, from all this information, determines the instantaneous slip of each of the wheels. The control unit controls the traction and braking torques as a function of the values of the slip determined for each wheel and in such a way as to optimize the braking, the acceleration and the steering angle in response to the commands from the driver.

In practice, the indication of the ground speed of the vehicle is a datum that is essential to a control system as proposed in this document. There is no direct measurement on board the vehicle that on its own makes it possible to have access that is not just easy but above all cost-effective and reliable to this datum that is fundamental to characterizing the behaviour of the vehicle. It must therefore be determined by calculations based on other measurements that are easier to obtain directly. It is known that the instantaneous speed of each wheel is an essentially variable factor, which is affected externally by the ground conditions, both with respect to the evenness of its profile and its surface condition, and internally, by the commands to which the wheel is subjected and that affect both its direction and the torques that are applied to it, and by the dynamic reactions of the vehicle itself that are transmitted to it via the suspension of the vehicle.

Thus, simply combining the measurement signals produced by the individual wheel sensors is insufficient to obtain a valid determination of the speed of the vehicle relative to the ground, which is sufficiently accurate, dynamic and reliable for a real-time assessment of the behaviour of the vehicle and its wheels. Furthermore, to be acceptable in practical terms, a solution must be able to be implemented easily and inexpensively on the vehicle.

Various solutions have already been proposed to try to improve the resolving of this problem. The published French patent application FR 2 871 889 describes, for example, a system that performs a diagnosis of the quality of each instantaneous measurement of the longitudinal speed of a wheel, based on the rotation speed supplied by a sensor attached to that wheel, and computes a longitudinal speed of the vehicle from an average of the longitudinal wheel speeds obtained and weighted by quality indices deriving from the preceding diagnosis. This diagnosis also includes a check that the longitudinal speed of each wheel concerned is within a range of values that ensures that the computation method, which is the subject of the patent, is applicable (speed not below 15 kph and not above 250 kph). This diagnosis also includes a check that the derivative of the rotation speed of each wheel concerned is within a certain range indicating that the wheel is neither immobilized, nor slipping, in order to reject the non-conforming indications. Thus, the method does not apply outside these various ranges. The computation is no longer valid outside these limits for supplying a measurement of the slip proper. In the case of a total absence of any conforming indication at a given instant, the system supplies a vehicle speed value extrapolated from the values determined at the preceding instants. Independently of any discussion regarding the applicability of the proposed method to all situations, the proposed extrapolation technique is unsuited to a monitoring of the behaviour of the vehicle by the system that is continuous, or during transitional phases that can last a few seconds, unlike the case of discontinuous operation, for example in an antilock braking control case, in which the system normally allows for a resumption of road grip involving a new valid measurement of the speed, after a fraction of a second following the detection of a fault.

Another proposal for overcoming the above difficulties is explained by the published French patent application FR 2 894 033, in which the longitudinal speed of the vehicle is calculated by combining estimates of the longitudinal speed of certain selected wheels, obtained from sensors measuring the rotation speed of these wheels. The computation method is adapted to each vehicle driving mode. The longitudinal speed of each wheel is corrected as a function of the possible position of the wheel when turning, then the state of the wheel (immobilized or slipping) is tested as a function of the value of the torque applied to that wheel. A test is then carried out on the consistency between the acceleration value obtained from the longitudinal speed obtained previously and the longitudinal acceleration measurement supplied by an accelerometer on board the vehicle. If the consistency checks out, the computed longitudinal speed is retained. Otherwise, it is a value obtained by integrating the measurement from the accelerometer that is adopted.

In practice, the measurement from the accelerometer is affected by the error due to the component of the terrestrial acceleration according to the possible slope of the ground on which the vehicle is moving. It follows that, on the one hand, the validity tests on the longitudinal speed measurements proposed for the wheels do not appear sufficiently accurate to provide reliable indications concerning the vehicle speed and that, on the other hand, the proposed method for testing the consistency of the accelerations and, in the event of a consistency fault, for determining the speed is affected by errors incompatible with continuous operation during periods that can extend to several seconds, for example in the case of prolonged emergency braking (or pronounced acceleration).

Determining the overall speed of a vehicle relative to the ground therefore remains an essential issue in developing vehicle behaviour control systems. Such is more particularly the case, as has been explained above, for the vehicles that have one or more wheels each coupled to an independent electric machine. Furthermore, this issue is particularly important in the case of an electric vehicle for which not only the traction but also braking are fully and directly derived from the electrical energy. The applicant has recently proposed, for example, in the patent application No. WO 2007/107576 such a vehicle equipped with reliable means for ensuring that in all circumstances there is the capacity to have a regenerative electrical braking torque on each wheel concerned that is sufficient to guarantee the safety of the vehicle, without any added mechanical braking. It is advisable to be able to have such a vehicle benefit from the dynamic and accurate traction and braking torque control possibilities offered by the electric machines for controlling the behaviour of such a vehicle.

It is obviously tempting to want to benefit from the control flexibility conferred by the presence of an individual electric machine for two or more wheels of a vehicle to adjust, when running, the specific motive or braking torque applied to each of these wheels as a function of the running circumstances as detected from sensors sensitive to the behaviour of the vehicle or of these wheels relative to the roadway. Various measurements are commonly carried out these days on vehicles for this purpose. It is possible, for example, to measure the angular speed and/or acceleration of each wheel to supply detection parameters to the wheel anti-lock control systems. It is also commonplace to take yaw angle variation measurements in the vehicle stability control systems. The duly measured parameters are combined to make it possible to control in real or quasi-real time the torques applied to the wheels. Now, very generally, determining these parameters requires a precise knowledge not only of the angular speed of one or more wheels of the vehicle to be controlled but also of its linear speed at the level of that wheel and of its overall or average linear speed. In practice, the speed of the wheels of the vehicle is not the same for all in the case of a turn. Furthermore, the linear speed of the vehicle at the level of a given wheel cannot necessarily be deduced simply from the angular speed measured on said wheel because, notably, of the factors due to the dynamic behaviour of the vehicle, such as slips induced by the braking or acceleration forces in the area of contact of these wheels with the ground.

EXPLANATION OF THE INVENTION

In light of these developments and of the state of the art that has just been described, the subject of the present invention is thus a system capable of supplying, at each instant, a reliable estimation of the linear speed of the vehicle, notably to make it possible to control certain parameters of the behaviour of its wheels with respect to the ground. It is particularly well-suited to vehicles in which the driving and braking of each driving wheel of the vehicle are fully or totally obtained from one and the same electric machine, specific to that wheel.

To that end, according to one aspect, the subject of the invention is a vehicle control system comprising an estimation of the instantaneous speed relative to the ground of a vehicle having at least two wheels, each equipped with a sensor suitable for supplying a measurement that is a function of the rotation of said wheel, which comprises:
(a) an indicator suitable for supplying at said instant an indication that is a function of the circumferential speed for each wheel from the measurement of the corresponding sensor,
(b) a vehicle speed indicator suitable for producing a vehicle ground speed estimation at that instant as a function of indications obtained from the indicators a) on completion of a step for diagnosing the condition of said wheels.

The system is notably characterized in that it also comprises: c) a device diagnosing the retention or resumption of road grip of said wheel, indicating that the wheel has retained or regained the road grip regardless of the state of the ground on which it is running, based on at least one slip information item taken from an indication taken from another measurement on board the vehicle, and in that the vehicle speed indicator (313) operates according to the information obtained from said diagnostic device c) to produce an instantaneous vehicle speed estimation from the circumferential speed indications obtained from a wheel detected in a road grip condition by said diagnostic device. Said slip information item can advantageously be based on a road grip coefficient measurement and/or a determination based on a preceding estimation of the vehicle speed. The system is thus able to supply, very rapidly in certain cases, a road grip resumption information item for a wheel, regardless of the state of the surface of the ground on which it is running.

According to one embodiment, the vehicle control system is further characterized in that it comprises:
  d) a device for diagnosing loss of wheel road grip based on a measurement of acceleration, positive or negative, of the wheel taken from the corresponding wheel sensor, and
  e) a device for diagnosing the validity of the circumferential wheel speed indications to supply an acceptable approximation of the vehicle speed sought based on a measurement of the road grip coefficient of said wheel, and in that the vehicle speed indicator operates selectively according to the information obtained from the diagnostic devices to produce said instantaneous vehicle speed estimation based on the circumferential speed indications obtained from just those wheels whose condition has been the subject of at least two positive diagnoses on the part of the devices c) to e).

According to a preferred embodiment for its implementation, the vehicle control system is also characterized in that the device e) for diagnosing the validity of the circumferential wheel speed indications, to supply an acceptable approximation of the vehicle speed sought on the basis of a measurement of the road grip coefficient of said wheel, is suitable for testing the value of the road grip coefficient measured relative to a first threshold below which the circumferential wheel speed provides an approximation that is valid for this purpose.

It is then advantageous to provide for the device c) for diagnosing the maintaining or restoration of the road grip of a wheel according to a test of the instantaneous slip of the wheel to be able to test the value of the road grip coefficient as a function of a second threshold value and/or the value of the instantaneous slip rate of the wheel obtained from an estimation of the vehicle speed at a preceding instant relative to a predetermined threshold.

According to a preferred embodiment, the vehicle speed indicator calculates an average value of the speed indications retained on completion of the validation stage.

Provision is advantageously made for the diagnostic device d) to be able to detect a loss of road grip of each wheel according to a threshold value that is different depending on whether said wheel is subject to an acceleration or a deceleration, to reject an indication corresponding to a wheel with loss of road grip.

A module is preferably provided to calculate the road grip coefficient in response to an indication of the torque applied when running to each of these wheels and to an indicator of the dynamic load of the vehicle on each of the wheels concerned.

The control system also comprises a sensor suitable for supplying an instantaneous indication that is a function of the turn radius of the vehicle to produce an indication of the circumferential speed of each wheel corrected as a function of the turn radius of the vehicle and of the position of that wheel in the turn to the diagnostic devices and to the vehicle speed indicator. A sensor sensing the instantaneous steering radius of the vehicle can supply a good approximation of the turn angle sought.

According to a preferred characteristic, the system also comprises at least one vehicle movement acceleration sensor, and the vehicle ground speed indicator is suitable for calculating a vehicle ground speed value as a function of the measurement of this sensor, when no circumferential wheel speed has been able to be retained by the diagnostic devices. Preferentially, this ground speed indicator comprises a stage for calculating the inclination of the vehicle to the horizontal produced from at least one wheel sensor measurement and from the indication from another angle sensor associated with the vehicle, to generate a vehicle movement acceleration indication suitable for integration during a time slot at the end of which no wheel speed indication could be retained by the diagnostic devices.

Another diagnostic device can be provided, in addition, to monitor the integrity of the operation of the wheel sensors and/or of the vehicle's data transmission network(s) which supply said diagnostic and indication devices.

According to another aspect, the invention also relates to a system for controlling a vehicle relative to the ground, based on the generation of an indication of the instantaneous slip of at least one wheel subject to a traction and/or braking torque when running, comprising a sensor suitable for supplying a measurement that is a function of the rotation of said wheel and a first indicator suitable for supplying a quantity as a function of the circumferential wheel speed based on the measurement of said sensor. The system is notably characterized in that it comprises a second indicator suitable for supplying an indication that is a function of the speed of advance of the vehicle relative to the ground in the position of said wheel, based on a system for estimating the instantaneous speed of the vehicle as defined in the above explanation of the invention, and a computation stage that operates in response to the first and second indicators at a given instant to supply an indication of the slip of said wheel as a function of the difference between the circumferential speed of the wheel and the speed of advance of the vehicle at the position of that wheel.

According to one characteristic, this system is suitable for generating an indication of the instantaneous slip for at least two wheels subject to traction and/or braking torques when running, and it comprises a sensor for each of said wheels of the vehicle, coupled to the first indicator so as to supply a respective indication as a function of the circumferential speed of each of said wheels, and the second vehicle advance speed indicator, at the position of one of the wheels for which the slip is calculated, operates according to at least the measurement from the sensor associated with another wheel.

In order to take account of the behaviour of the wheels when turning, a coefficient is generated for each wheel, according to the possible turn radius of the vehicle at the instant concerned and the position of said wheel in the turn, and assigned a quantity representative of an overall vehicle advance speed relative to the ground to determine the vehicle advance speed on the ground at the position of each wheel for which the slip is calculated.

According to another aspect, the invention also relates to a torque control system on a wheel of a vehicle comprising at least one rotary electric machine to drive that wheel in traction or in braking and a rotation sensor for said wheel, which comprises:
  a system suitable for supplying an estimation of the instantaneous speed of the vehicle relative to the ground, in accordance with the explanation of the invention given hereinabove,
  a stage for calculating the slip of said wheel at a given instant in response to a speed indication for that wheel at that instant, derived from said sensor and said vehicle speed estimation relative to the ground, and
  a unit controlling the current in the electric machine suitable for adjusting the torque applied to the wheel as a function of the value of the slip of said wheel calculated at that instant so that the slip complies with a given setpoint relationship.

According to another embodiment, said setpoint relationship corresponds to the maintaining of a given minimum ground road grip level for said wheel in the running condition of the moment. It can also correspond to keeping the calculated slip below a programmed setpoint value. In one embodiment, said setpoint value is identical for each wheel. A preferential value for this setpoint value lies in the vicinity of 15%.

Finally, the invention also targets the electric traction vehicles equipped with at least one wheel coupled to a rotary electric machine suitable for fully driving that wheel in traction and in braking and a system for controlling ground behaviour in accordance with the above explanation. It is designed for application to those vehicles whose traction and braking are obtained in a purely or fully electrical manner from that machine, that is to say, notably, without involving the application of a mechanical friction torque to the wheels.

BRIEF DESCRIPTION OF THE FIGURES

Other objectives and benefits of the invention will become clearly apparent from the following description of exemplary preferred but nonlimiting embodiments, illustrated by the following figures in which:

FIG. 1b is a more detailed diagram of a part of FIG. 1a;

DESCRIPTION OF ONE OR MORE EXEMPLARY EMBODIMENTS

Figure 1A:
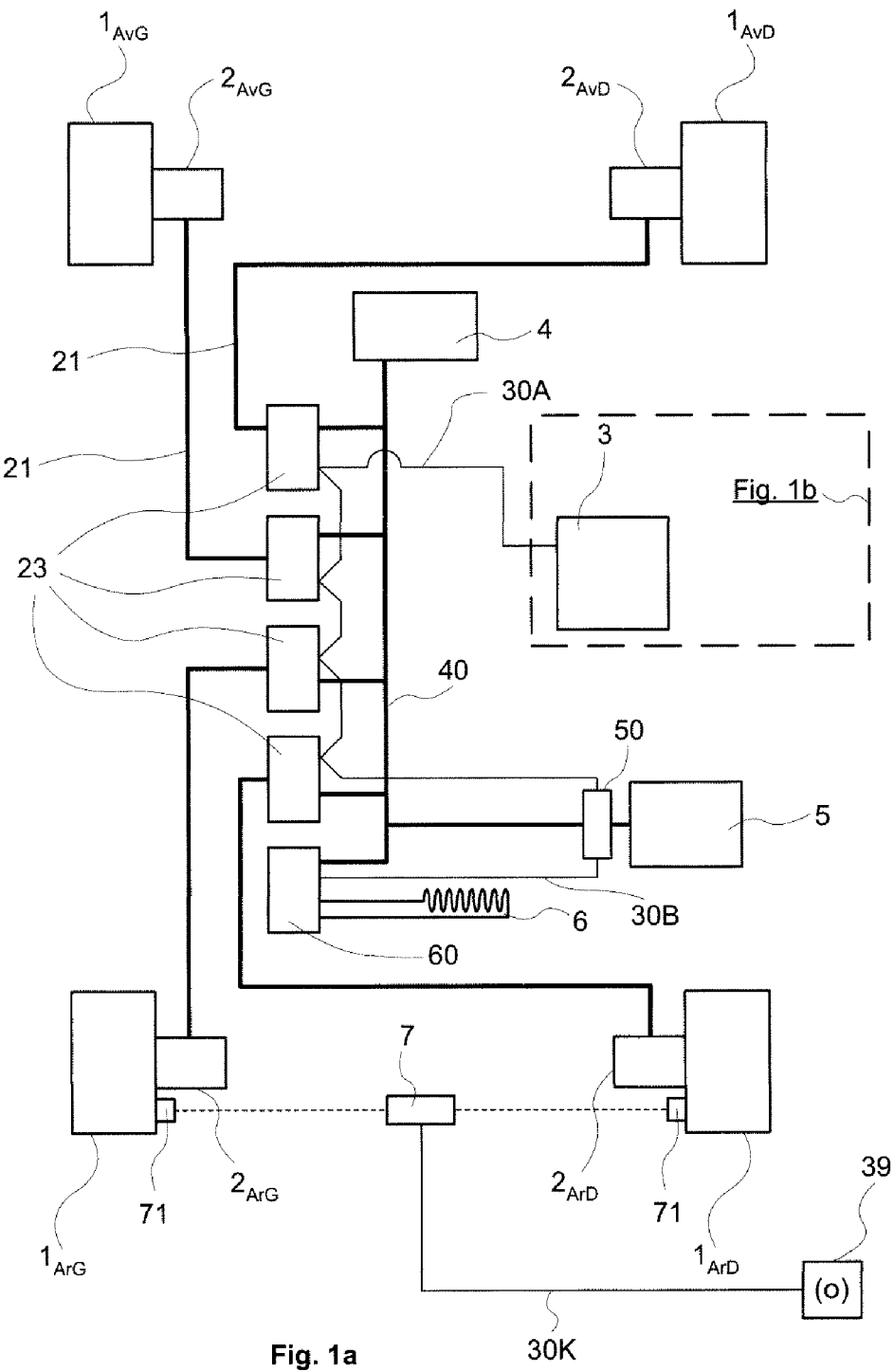
FIG. 1a diagrammatically represents a system for controlling the driving and the braking of an electric vehicle with four driving wheels, with on board electric energy production.

FIG. 1a diagrammatically represents a vehicle with four wheels $1_{AvG}$, $1_{AvD}$, $1_{ArG}$ and $1_{ArD}$. The wheels are denoted $1_{AvG}$ for the front left wheel, $1_{AvD}$ for the front right wheel, $1_{ArG}$ for the rear left wheel and $1_{ArD}$ for the rear right wheel. Each wheel is equipped with an electric machine that is mechanically coupled to it. The electric machines $2_{AvG}$, $2_{AvD}$, $2_{ArG}$ and $2_{ArD}$ can be seen. Hereinafter, the indices specifically designating the position of the wheel 1 or of the electric machine 2 in the vehicle will not be repeated when it adds nothing to the clarity of the explanation. The traction electric machines 2 are three-phase machines of self-controlled synchronous type. They are each equipped with an angular position sensor of resolver type 11 (FIG. 3) incorporated behind the machine and are each controlled by a respective electronic wheel control module 23 to which they are connected by electric power lines 21.

The electronic wheel control modules 23 are designed to control the electric machines torque-wise based on the measurement of the currents in the machine and on the measurement from the angular position sensor 11. Each electronic wheel control module 23 makes it possible to selectively impose on the wheel concerned a control torque that is predetermined in amplitude and sign. Because of this, the electric machines can be used as motors and as generators. Each electronic module uses a digital processing function to calculate the rotation speed Ωr of the rotor of the machine and its angular acceleration Ω'r. Knowing the reference development of the wheel, and more precisely its tyre, defined as the linear distance traveled by the vehicle for one wheel revolution in the absence of any torque and longitudinal force, and knowing the reduction of the connecting gearing between the axis of the rotor and the wheel, each electronic module 23 converts the angular speed and acceleration, respectively Ωr and Ω'r, into linear speed and acceleration, respectively, $V_r$ and $\gamma_r$, restored to the vehicle. It should, however, be noted that it would be possible to implement certain principles of the invention with an independent wheel speed measurement, for example, for wheels not equipped with motors, to use a speed sensor of the Hall-effect sensor type for ABS (Anti-Blocking System) or operating on any other principle.

For the record, in this example each of the rear wheels $1_{ArG}$ and $1_{ArD}$ is also equipped with a mechanical brake device 71 for the wheel when stopped and only when stopped, controlled by an electric actuator 7 driven by a braking control unit. In the inventive application described here, none of the wheels of the vehicle includes any mechanical service brake. Whatever the amplitude of the braking control signal, that is to say even for the most intense braking situations, the braking is handled solely by piloting the electric machines in generator mode. The means are provided for ensuring the consumption of all the power produced even in a particularly powerful braking situation. These means can comprise a storage capacitance, circuits for using energy produced in real time and means for dissipating the excess power of the preceding two consumption modes. Each wheel includes one or more dedicated electric machines in order to be able to generate a braking force selectively on each wheel, which could not be done with an electric machine that is common to several wheels, for example the wheels of an axle, because in this case there would be a mechanical transmission and a differential between the wheels. The electric machines are dimensioned appropriately to impose on each wheel the highest possible braking force.

In order to make it possible to absorb a high electrical power, dissipating electrical resistors have been installed that are effectively cooled, for example by the circulation of water, the known electric accumulators not being capable of absorbing the electrical power produced by emergency braking or not being capable of absorbing all the electrical energy produced by braking over a long duration, except by installing a capacitance such that the weight of the vehicle would be truly prohibitive. Thus, the electric system represented here, a more detailed description of which can be found for example in the patent application WO 2007/107576 A1, published in the name of one of the applicants, is an autonomous electrical system isolated from the environment, with no exchange of electrical energy with the exterior of the vehicle, and therefore also applicable to motor vehicles, application of the electric braking systems being much more difficult than in the case of vehicles connected to an electricity network such as trains or urban trams.

It is possible, for example, to choose to have several electric machines whose torques are added together. In this case, an electronic wheel module can drive several electric machines in parallel installed in one and the same wheel. On the subject of the installation of several electric machines in a wheel, reference should be made, for example, to the patent application WO 2003/065546 and the patent application FR 2776966.

The example chosen and illustrated here describes an application to a vehicle that handles the production of electrical energy on board. FIG. 1a shows a fuel cell 4 delivering an electric current to a central electric line 40. Obviously, any other means of supplying electrical energy can be used, such as, for example, batteries. There can also be seen an electrical energy storage device consisting in this example of a bank of supercapacitors 5, linked to the central electric line 40 by an electronic recovery module 50. A dissipating electrical resistor 6 can be seen, preferably dipped in a coolant dissipating the calories to an exchanger (not represented), forming an energy absorption device able to absorb the electrical energy produced by the set of electric machines during a braking situation. The dissipating resistor 6 is connected to the central electric line 40 by an electronic dissipation module 60.

Figure 1B:
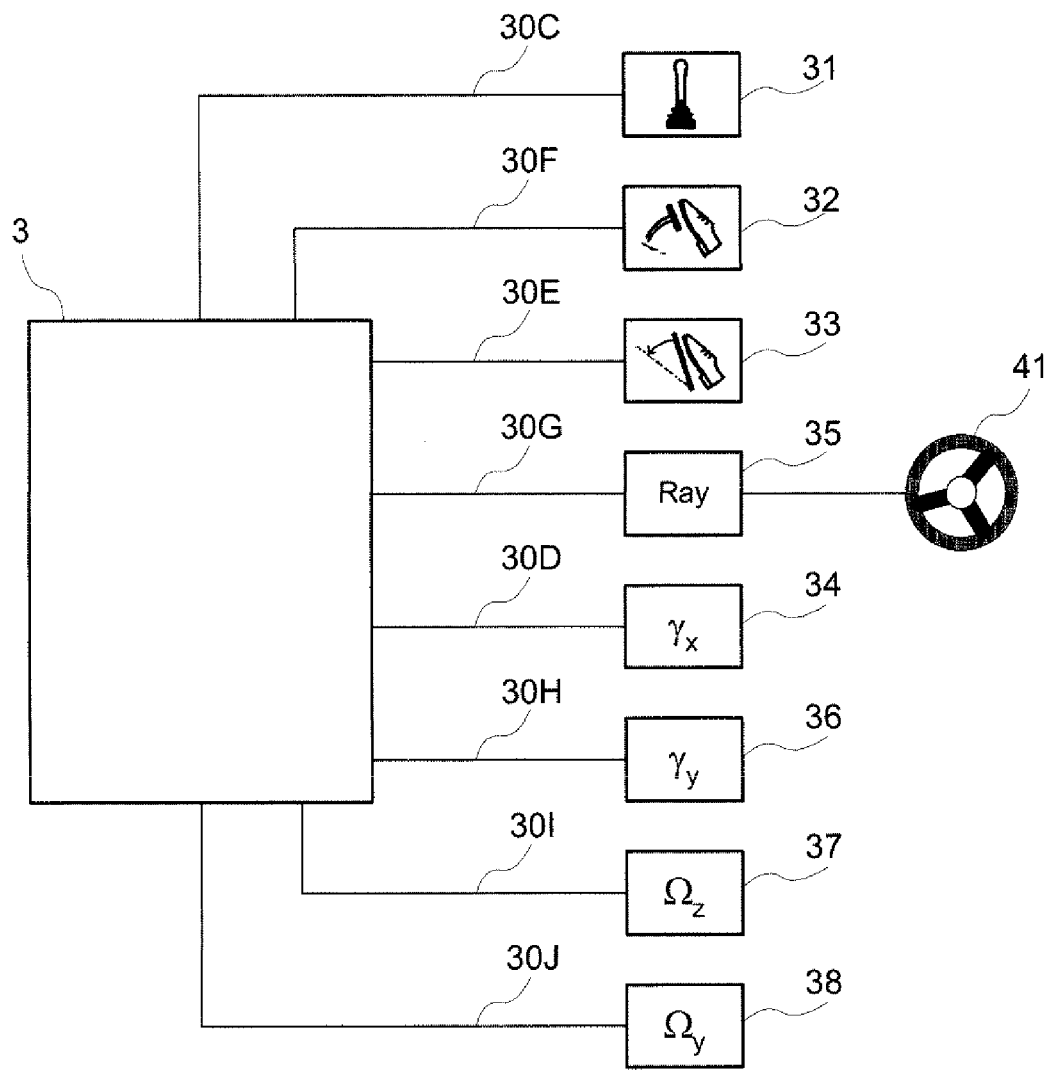

A central computation and control unit 3 manages various functions, including the electric traction system of the vehicle. The central unit 3 dialogues with the set of electronic wheel control modules 23 and with the electronic recovery module 50 via electric lines 30A (CAN bus®). The central unit 3 also dialogues with a plurality of controls detailed in FIG. 1b, namely in particular an acceleration control 33 via an electric line 30E, with a braking control 32 (service brake) via an electric line 30F, and with a control 31 selecting forward or reverse gear via an electric line 30C. The central unit 3 also dialogues, via an electric line 30G, with a measurement sensor or system 35 connected to the steering control 41 of the vehicle and making it possible to determine the steering angle radius Ray. Finally, for the management of the dynamic behaviour of the vehicle in this example, the central unit 3 dialogues, via an electric line 30D, with a sensor 34 sensing acceleration γx along the longitudinal axis X of the vehicle, via an electric line 30H, with a sensor or system 36 for measuring the acceleration γ y along a transversal axis Y of the vehicle, via a line 30I, with a sensor 37 sensing the angular yaw rate $\Omega_z$ about a vertical axis Z of the vehicle, and finally, via a line 30J, with a sensor 38 sensing the angular speed $\Omega$-y about the transversal axis Y. The information obtained from these sensors enable the central unit 3 to calculate, among other results, the dynamic loads on the wheels as they result from the load deviations between the front and rear wheels and between the right and left wheels of the vehicle as a function of the longitudinal (along the axis X) on the one hand, and transversal (transversal axis Y relative to the movement of the vehicle) accelerations.

The central unit 3 handles the management of the longitudinal displacement of the vehicle, and for this it controls all the electronic wheel control modules 23. It comprises on the one hand a traction operating mode activated by a control signal whose amplitude is representative of the total traction force desired for the vehicle, said control signal coming from the acceleration control 33, and on the other hand a braking operating mode activated by a control signal whose amplitude is representative of the total braking force desired for the vehicle, said control signal coming from the braking control 32. In each of these operating modes, whatever the amplitude of the respective control signal, the central unit 3 controls all the electronic wheel control modules 23 so that the sum of the longitudinal forces originating from the rotating electric machines on all the wheels 1 is a function of said amplitude of the control signal. Such is the case, in particular, for the braking operating mode. In other words, there is no mechanical service brake; the electric braking system described here is the vehicle's service brake.

Moreover, the central unit 3 is programmed to control the application of a specific set point torque to each wheel as a function of the dynamic load of each wheel so as to make each tyre work according to a predetermined behaviour programme. Thus, in the example described here, the programme regulates the torque on each wheel (and therefore the tangential force respectively applied to the ground by each wheel) according to an a priori fixed external strategy. Consequently, as will be seen later, each electronic wheel control module receives from the central unit a torque set point from which it determines a corresponding set point value $I_{cc}$ for the control current of the corresponding electric machine.

To return to FIG. 1a, as indicated previously, the actuator 7 of the mechanical parking brake device 39 is controlled via the electric line 30K only by this parking brake control 39, and absolutely not by the braking control 32 of the service brake, a safety device being provided to prevent the use of this brake outside of the parking situation. Finally, the electronic recovery module 50 dialogues with the electronic dissipation module 60 via an electric line 30B.

Figure 2:
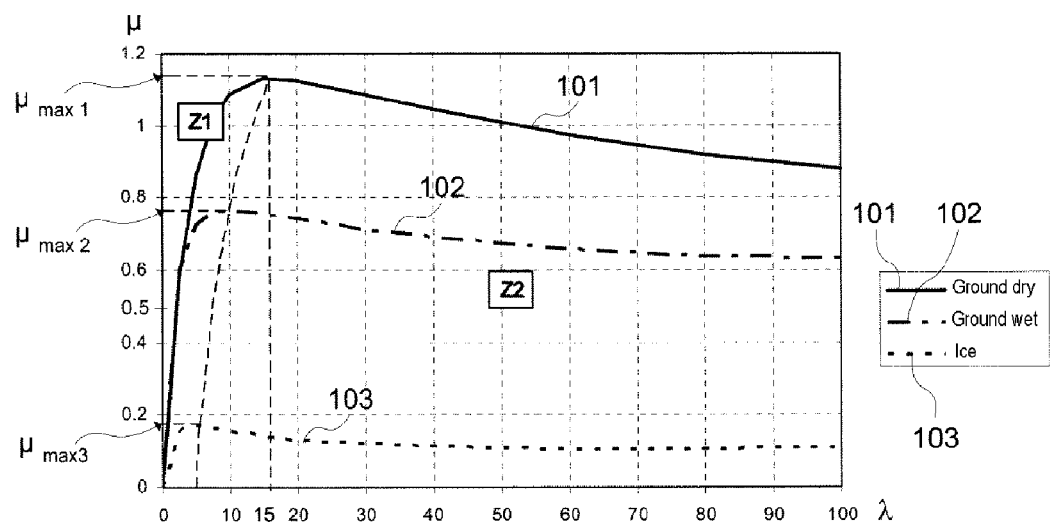
FIG. 2 is a diagram illustrating the variation of the road grip coefficient of a wheel as a function of the slip of that wheel relative to the ground.

Aspects concerning the implementation of the invention proper will now be explained. FIG. 2 represents three curves showing the variation of the road grip coefficient (μ) of a vehicle wheel 2, which can be typically equipped with a tyre, as a function of the slip (λ) measured in contact with the ground on which the vehicle is rolling, one 101 in the case of dry ground, another 102 in the case of wet, and therefore more slippery, ground and the third 103 in the case of icy and therefore very slippery ground. In these curves, it is possible to distinguish a first shaded area Z1 delimited on the right by a line joining the maximums of the road grip coefficients of these curves. In this area Z1, the operation of the wheel is stable, that is to say that the more the slip increases, the more the road grip coefficient increases also. This makes it possible to transmit to the ground the tangential forces resulting from the engine or braking torque applied to the wheel. In a second area Z2 corresponding to the higher slip values, the operation becomes unstable. As can be clearly seen for the curve 101, when the slip exceeds a certain threshold, in this case approximately 15%, the road grip coefficient drops. The tangential force passed to the ground therefore drops and the excess torque not transmitted further slows down the rotation speed of the wheel which also causes an increase in the slip, and so on; this is the loss of road grip phenomenon that rapidly leads (usually within a few tenths of a second) either to the momentary cancellation of the rotation speed of the wheel by the braking before it is made to rotate in skidding mode in the reverse direction of the displacement of the vehicle, or to its skidding by acceleration in the direction of displacement of the vehicle.

The maximum value of the coefficient ($\mu$) depends on the tyre, the nature of the conditions (dry, wet, etc.) of the ground on which the vehicle is rolling. In the case of a passenger vehicle equipped with tyres with good road grip quality, the optimum value of the road grip coefficient corresponds to a slippage located about 5% to 15%. Knowing that the road grip coefficient (considered here) is defined by the ratio of the force tangential to the ground to the load perpendicular to the surface of the latter in the area of contact of the wheel with the ground, the values mentioned therefore allow a maximum deceleration of 1.15 g (g here being the acceleration of gravity) on dry ground, 0.75 g on wet ground and 0.18 g on ice, inasmuch as it would be possible to maintain the operating point of the wheel on the ground at this optimum. One of the aims pursued by the present invention is to come as close as possible to this operation through an appropriate control of the torques applied at each instant to at least some of the wheels of the vehicle and, in particular, to the wheels that have driving and braking by electric machine.

Figure 3:
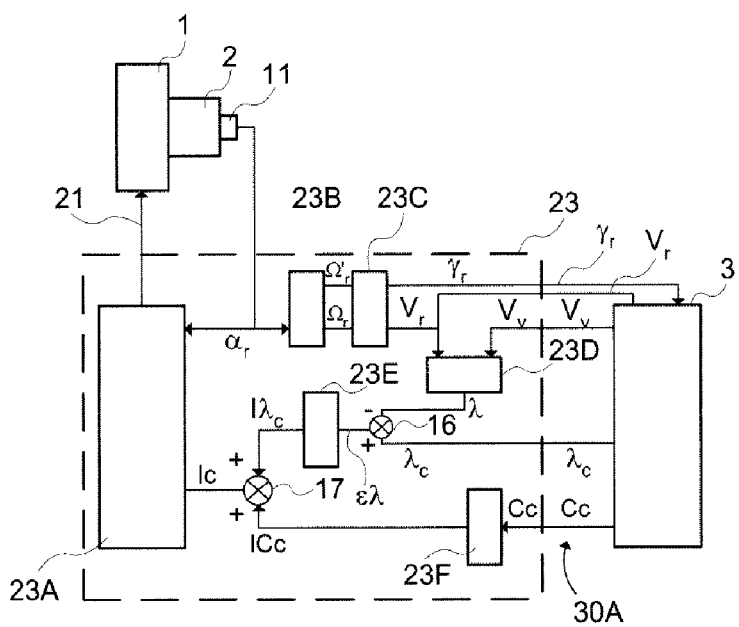
FIG. 3 is a block diagram illustrating the operation of a module for measuring slip and regulating current as a function of this measurement according to one aspect of the invention.

FIG. 3 very schematically represents the elements of a device for controlling the traction or braking torque applied to each wheel by the corresponding electric machine 2 as a function of the slip measurements made on that wheel in accordance with the invention. This representation mode is convenient for a good understanding of the explanations that follow. Obviously, the invention can be implemented using programmable hardware devices and conventional software used in managing and controlling road vehicles. The primary role of the electronic wheel module 23 is to control the torque of the motor or motors that are associated with it. The torque-current characteristic of the self-controlled three-phase synchronous machines 2 is well known, so controlling the current in these machines is therefore equivalent to controlling these machines torque-wise. In the wheel control module 23, this basic function is diagrammatically represented by the module 23A which controls the current on the power line 21 from a current set point Ic and from an angular position measurement $\alpha r$ of the rotor of the machine 2, delivered by the resolver 11. A computation module 23F makes it possible to convert the torque set point Cc delivered by the central unit 3 into the current set point Icc needed to generate this torque. The angular position information $\alpha r$ of the rotor of the machine 2 delivered by the resolver 11 is also used by a module 23B to calculate the angular speed, $\Omega r$, and the angular acceleration, $\Omega' r$, of said rotor. Knowing the reference development of the wheel, and more precisely of its tyre, defined as the linear distance traveled by the vehicle for a wheel revolution in the absence of any longitudinal torque and force, and knowing the reduction of the connecting gearing between the axis of the rotor and the wheel, the module 23C converts the angular speed, $\Omega r$, and the angular acceleration, $\Omega' r$, of the rotor respectively into a circumferential linear wheel speed indication, $V_r$ (restored to the vehicle as will be seen later) and into a circumferential linear wheel acceleration indication, $\gamma_r$. These circumferential wheel speed and acceleration indications, respectively $V_r$ and $\gamma_r$, are transmitted to the central unit 3 over the CAN communication bus 30A.

In addition to the torque set point Cc, the control module 23 receives from the central unit 3, via the CAN communication bus 30A, a maximum acceptable slip set point ($\lambda c$) and an indication of the ground speed ($V_v$) of the vehicle proper, to which we will return later.

With a periodicity of 1 ms to 2 ms, the wheel control module 23 performs a calculation of the slip $\lambda$ at the instant concerned according to the formula $(V_r - V_v)/V_v$, diagrammatically represented by a block 23D which receives the digital indications $V_v$ from the central unit 3, and $V_r$ from the module 23C. During a wheel acceleration phase, the wheel speed is greater than the vehicle speed and the slip, according to the formula defined previously, is positive, whereas during braking, the wheel speed $V_r$ is less than the vehicle speed $V_v$ and the slip is negative. To simplify the explanation, $\lambda$ will be considered hereinafter to be the absolute value of the slip, in the same way as the maximum slip set point $\lambda c$ and the current set point Icc will always be considered to be positive. The calculated slip indication is used (as diagrammatically represented by a comparison module 16) to supply a signal indicative of the deviation $\epsilon\lambda$ between the calculated slip and the set point slip ($\lambda c$) delivered by the central unit 3. In the case where the deviation $\epsilon\lambda$ between the calculated slip $\lambda$ and the set point slip $\lambda c$ indicates that this maximum set point is exceeded by the instantaneous slip, this information is used by a regulator 23E, which can, for example, be a conventional PID (Proportional Integral Derivative) regulator, to generate a current set point I$\lambda c$. An overall current set point Ic is then calculated (adder block 17) by summation: (i) of the initial current set point Icc, generated from the torque set point (block 23F), and (ii) of the current set point I$\lambda c$ obtained from the regulator 23E. It is this overall set point Ic that is applied to the module 23A controlling the current of the electric machine 2, which also receives the angular position indication for the rotor of the electric machine delivered by the resolver 11. Thus, for example, as long as the slip $\lambda$ remains less than the set point $\lambda c$, during an acceleration phase, nothing happens. If the wheel begins to skid, in which case X becomes greater than $\lambda c$, the deviation from the set point slip becomes negative. The corresponding current indication I$\lambda c$ at the output of the module 23E, also negative, therefore reduces the indication of the initial set point current Icc in the summation block 17 so as to reduce the torque applied to the wheel and keep the slip at the maximum at $\lambda c$.)

The information processed by the central unit 3 (torque set point Cc, vehicle speed $V_v$, and slip set point $\lambda c$ are delivered to the wheel module 23 at a relatively slow rate of 10 to 20 ms, relatively slow but well suited to the vehicle behaviour dynamics. Conversely, the information obtained from the modules specific to each wheel (23B, 23C, etc.) and the processing operations performed by the modules 16, 17, 23D and 23E are performed at a relatively fast rate, corresponding to a period of 1 to 2 milliseconds, well suited to the wheel dynamics. Bearing in mind, finally, that each electronic wheel control module 23 makes it possible to selectively impose on the wheel concerned a control torque that is predetermined in amplitude and sign, there is thus a fast and effective system allowing for ongoing control of the slip in the braking direction (preventing rotation reversal) and in the motive direction (anti-skid), and on each wheel that is fully controlled in traction and braking by the single electric machine. A genuine automatic control of the road grip of the wheel with its tyre is produced in this way.

According to another aspect of the invention, the system is arranged to make it possible to determine a value that is overall representative of the ground speed of the vehicle using instantaneous measurements obtained on board and possibly correct this value to obtain the ground speed of the vehicle at the place of each wheel in order for the corresponding slip calculation to remain as accurate as possible in all circumstances, and in particular when turning.

Some aspects of this technique rely on the determination of the road grip coefficient of a given wheel at an instant concerned which must be explained first. When the wheel is subject to just the torque supplied by the electric machine or machines with which it is coupled (either because it does not comprise any internal combustion engine drive, or mechanical braking, typically friction-based—in accordance with the teachings of the patent application filed by the applicant and reviewed in the preamble—or because it is temporarily in this condition at the instant concerned), this torque on the wheel directly corresponds with the current passing through said electric machine or machines 2. Knowing the reference radius of the wheel 1, it is then possible to deduce therefrom, at each instant, the tangential force exerted on the ground by the wheel.

Figure 8:
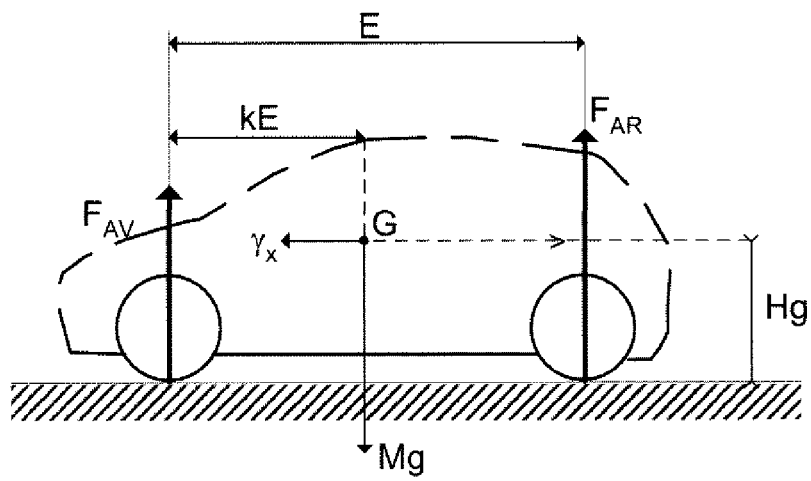
FIG. 8 specifies the definition of the points of application of the forces acting on the vehicle.

Moreover, knowing the wheel base E of the vehicle (see FIG. 8), the total weight of the vehicle M, its distribution kM and (1−k)M between the rear axle system and the front axle system and the height Hg of the centre of gravity, and finally knowing/measuring the linear accelerations $\gamma_x$ and $\gamma_y$ supplied by the measurement sensors or systems 34 and 36 (FIG. 1*b*), the central unit 3 is able to measure, at each instant, the load, or normal force $F_{AV}$ and $F_{AR}$, on the front and rear axle systems. Knowing the track V of the vehicle, the central unit 3 is also able to determine the distribution of the loads between the wheels of each of the front and rear axle systems.

The weight and centre of gravity position quantities can be measured when the vehicle is powered up by a suitable system of sensors or any other equivalent. In the example described here, we have more simply opted for nominal values corresponding to the vehicle model concerned with two passengers on board. As indicated previously, the central unit then calculates the instantaneous road grip coefficient $\mu_r$ of the wheel as the ratio between the tangential force and the normal force exerted on the ground by the wheel at the instant concerned.

If we now return to the determination of the vehicle speed, it is based on a calculation of the average of the circumferential speed values of the wheels $V_r$ derived from the measurements of the sensors 11 and previously validated according to criteria that will now be described, to retain only those of these values that are judged reliable for this calculation. Thus, as long as at least one of the wheel speed values is valid, according to these criteria, it will be used to determine the reference vehicle speed at the given instant according to the formula:

$$V_v = \text{sum of valid } V_r/Nb\_\text{valid\_wheels} \quad (g)$$

If no circumferential wheel speed is valid at the given instant, the vehicle speed is then calculated by the central unit, from the last valid vehicle speed obtained, by integrating an indication of the movement acceleration of the vehicle estimated as will be seen hereinbelow.

The measurement $V_r$ is considered to be valid if the following conditions are met:

(a) The system does not detect any fault in the exchanges of digital information circulating over the CAN bus 30A. The electronic components specifically responsible for managing communication over the CAN bus, and respectively incorporated in the central unit 3 and in each of the electronic wheel modules 23, check the correct operation of the communication system and the integrity of the digital information circulating therein. Said components generate, as appropriate, CAN fault information that can be used by the central unit 3 and/or the electronic wheel modules 23. Moreover, the central unit 3 regularly sends information (set points; $V_v$; . . . see FIG. 3) to the electronic wheel modules 23 with a rate of between 10 and 20 ms (in this case 16 ms). If this rate is not observed, the electronic module detects a CAN fault (central unit absent following a failure, a break in the CAN connection, etc.) and disregards the data originating from the CAN bus. Symmetrically, the modules 23 respond to the central unit ($V_r$; current; faults; etc.) with this same rate of 16 ms. If the central unit confirms that the rate is not observed for one of the electronic modules 23, it declares the module concerned to be absent and disregards its data (in particular $V_r$).

(b) The electronic control module 23 associated with the wheel concerned does not detect any fault on the resolver 11.

(c) Said wheel has not lost its ground road grip. In this respect, it is considered that there is a loss of road grip mainly when the circumferential wheel acceleration γ-r is abnormal, that is to say too high for the physics of the vehicle. For example, it is considered that a value exceeding 0.7 g in the motive direction and 1.2 g in the braking direction indicates a loss of wheel road grip. Note that these acceleration values are here derived from the information supplied by the resolver 11 to the wheel control module 23 and to the central unit. When a loss of road grip has been detected on one of the wheels, the return to normal road grip, and therefore to a valid speed measurement for said wheel, occurs only if the slip measurement for the wheel concerned takes a sufficiently low value for it to be possible to consider that the error is acceptable for the vehicle speed measurement (3%), or else that pr is sufficiently low to guarantee the wheel road grip regardless of the ground condition (15% given a very slippery ground condition corresponding to the curve 103 of FIG. 2).

(d) The road grip coefficient (w) calculated at the instant concerned is less than a limit value (μ lim) beyond which the slip, as it results from the curves μ(λ) of FIG. 2, is deemed too high for it to be possible to continue to consider the circumferential speed of the wheel to be an acceptable first approximation of the speed of the vehicle at the place of said wheel. If we consider, for example, a value of (μ-lim) as represented in the region of 50%, it is possible to confirm that the slip values corresponding to the values of μr below this limit are small (curves 101 and 102). They lead to an error in determining the average speed that does not exceed 1.5 to 3%, which is deemed acceptable.

Observation of the curves of FIG. 2 shows that said curves have little dependency on the ground condition, for values of pr below μ-lim (in the region of 50%), when the maximum road grip on the ground $\mu_{max}$ exceeds μ-lim (case of $\mu_{max1}$ and $\mu_{max2}$ for the curves 101 and 102). Then, knowing the characteristic μ(λ) of the tyre used, in particular, for μ less than 50%, it would be possible to determine the slip X corresponding to the working pr at the instant concerned and accordingly weight the wheel speed measurement $V_r$.

The indication of the road grip coefficient determined as explained can be affected by an error, for example corresponding to the variations of the actual load of the vehicle relative to a nominal load taken into account for calculating the normal force on the wheel. However, it can be confirmed, by observing the curves 101 and 102, that a big error on the road grip coefficient around 50% has little influence on the corresponding slip value. It has been determined in practice that, for the application of the validity criterion described here (namely the validity of the approximation consisting in using the circumferential speed of a wheel instead of the speed of the vehicle measured at the position of the latter) these inaccuracies do not significantly affect the quality of the decision made on the basis of the road grip coefficient value.

If we now consider the case of ground with a particularly low road grip coefficient (curve 103), the value indicated for (μ-lim) exceeds the maximum road grip coefficient $\mu_{max}$ of the ground. The wheel concerned has a tendency to accelerate very quickly in an abnormal manner but the loss of road grip is then detected by the criterion (c) explained previously. On the other hand, it can be seen that, if the road grip coefficient μ is less than 15%, the wheel is in a situation of road grip with the ground regardless of the state of the latter (curves 101, 102 or 103). This value supplies a test criterion for maintaining or restoring the road grip of the wheel (see step 113 in FIG. 4).

The system thus determines a vehicle speed value that does not strictly represent the speed of a predetermined fixed point of the vehicle (for example, the centre of gravity of the vehicle), and that will be qualified here as "overall". To calculate the slip of a given wheel, the system must also check that this value is sufficiently close at the moment concerned to the ground speed of the vehicle in the position of the wheel concerned in the trajectory of the vehicle. Such is normally the case if the vehicle is moving in a straight line. In this case, the overall speed $V_v$ transmitted by the central unit to the module 23 makes it possible to directly obtain the appropriate representation of the slip from the wheel speed indication $V_r$. Such is not the case, on the other hand, when the vehicle is turning. In this case, the overall speed of the vehicle and its speed at the level of the wheel differ by a correction coefficient which is both a function of the turn radius and of the position (inside or outside) of the wheel in the turn. The central unit 3 is programmed to determine this correction coefficient as a function of the indication of the steering angle radius Ray transmitted over the line 30G from the measurement system 35 connected to the steering control 41, and by a factor that takes account of the position (inside or outside) of the wheel in the turn.

The correction coefficients are established according to an empirical relationship for each type of vehicle concerned, in this example on the basis of real measurements carried out on the vehicle concerned. The value of the correction coefficient that is appropriate to each wheel in the instantaneous situation of the vehicle (direction and radius of the turn) is used by the central unit 3 to calculate a corresponding circumferential speed correction value:

$$\Delta V_{rAr}int, \Delta V_{rAr}ext, \Delta V_{rAv}int \text{ and } \Delta V_{rAv}ext, =f(Ray),$$

(in which Ray here represents the steering angle radius), for the front (Av) and rear (Ar) wheels, inside (int) and outside (ext) in the turn.

The value $V_v$ is transmitted to the control module 23 corresponding to each wheel and combined with the circumferential speed of this wheel corrected ($V_r+\Delta V_r$) in order to determine the value of the slip at the corresponding instant with sufficient accuracy. It will be noted here that, in the interests of clarity, FIG. 3 does not show the process of transmitting and generating corrected speed values. On the other hand, the principle of this correction is clearly taken into account in the flow diagram of FIG. 4b hereinbelow.

The trials of the applicant have shown that it was possible to determine for each wheel a correction coefficient that gives consistent corrected measurements to within 1.5% for all the wheels concerned.

Figure 4A:
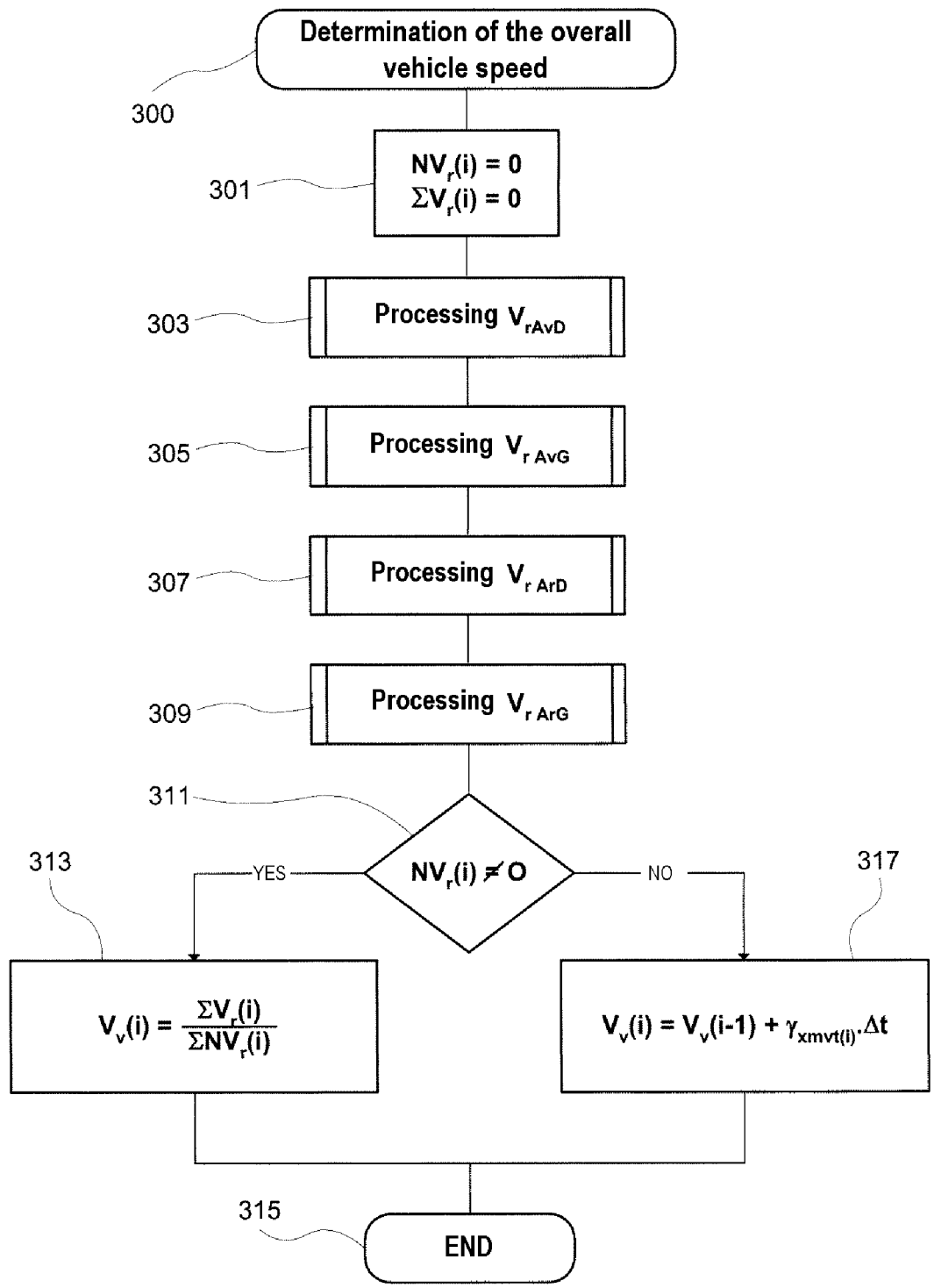
FIGS. 4a and 4b are flow diagrams of the operation of another module of the inventive system.
Figure 4B:
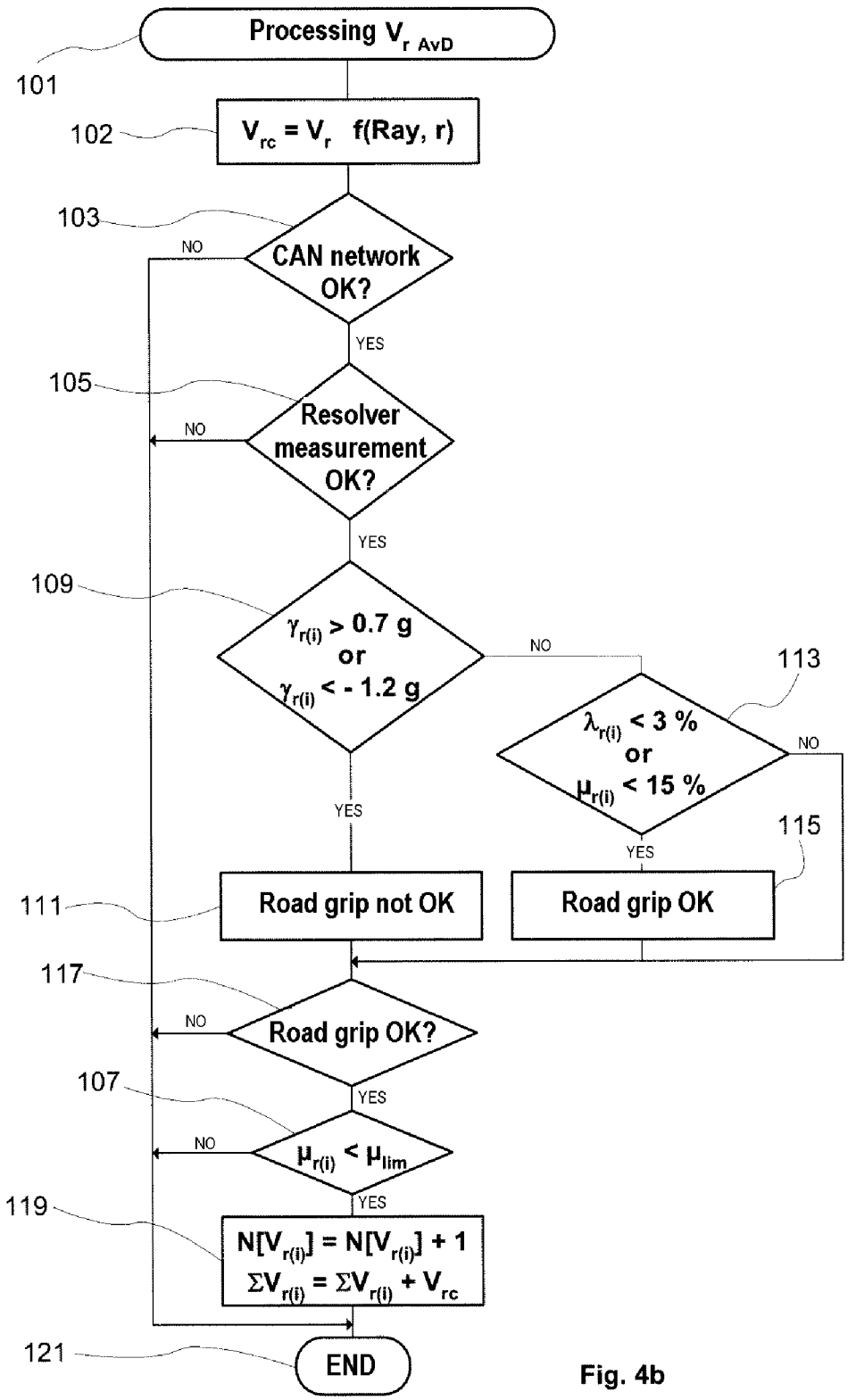

At this stage, FIGS. 4a and 4b give a simplified flow diagram of the procedure for determining the vehicle speed, for a vehicle with four wheels electrically controlled torque-wise like that of FIG. 1. The flow diagram of FIG. 4b illustrates the processing of the circumferential speed signal $V_{rAVD}$ from the front right wheel $1_{AVD}$ of the vehicle at a given instant (step 101) and begins with a calculation (step 102) of the value of this speed $V_{rc\ AVD}$ compensated for any turns by a factor f(Ray, avd) that takes into account both the steering angle radius of the vehicle and the position of the wheel $1_{AVD}$ relative to the direction of the turn. The system then examines its validity as a first approximation of the vehicle speed at the position of this wheel. To this end, the following are checked in succession: the absence of faults on the CAN network (step 103) and in the information from the corresponding resolver 11 (step 105), then, if the result is affirmative, the value of the angular acceleration of said wheel (step 109) relative to an upper limit for entering into a skid and a lower limit corresponding to a deceleration that can lead to a reversal of the direction of rotation of the wheel. If this acceleration value is outside the range defined by these limits, a road grip fault indicator is activated (step 111). Otherwise, the process tests (step 113) whether the last calculated slip value is less than 3% or if the value of the road grip coefficient μ is less than 15% with the result that the wheel has returned to a ground road grip condition after a loss of road grip, even in the case of the curve 103 (ice, FIG. 3). If the test is positive, this leads to the activation of a road grip indicator (step 115). If the result is negative, the process checks the state of the indicators 111 and 115 (step 117) and if a road grip indication has been detected, checks whether the value of the road grip coefficient t determined for the wheel at that instant is below the upper limit $\mu_{lim}$ (step 107). If the result of one of the tests 103, 105, 117 or 107 is negative, the process goes directly to the end of the processing operation (point 121) for the wheel $1_{AVD}$ at the instant concerned and goes on to the next wheel (as explained below with reference to the flow diagram of FIG. 4a. If the test on completion of the step 107 is positive, a counter recording the number of wheels selected on completion of the processing of the wheel signals $V_r$ in the sequence examined for the instant concerned is incremented. The speed of the last wheel selected is added to the sum $\Sigma V_r$ of the speeds of the wheels already selected (step 119).

The processing that has just been reviewed is part of a step 301 of a process for determining the overall vehicle speed (point 300) which begins with an initialization (step 301) of the selected wheel counter and of the selected wheel speed summation register, already mentioned. As also indicated, the signals from the wheels A1 are processed in succession in the processing steps 303 to 309. On completion of this phase, the state of the selected wheel counter is checked (step 311). If this number is not zero, the system calculates the average $V_v$ of the selected wheel speeds (step 313) and displays it as the overall vehicle speed for the instant concerned (point 315) at the end of the process. If the step 311 detects that no wheel has been selected, the output triggers a subprocess (step 317) as will be explained hereinbelow.

Thus, when no circumferential wheel speed measurement taken from the wheel sensors or resolvers 11 can be retained to estimate the ground speed of the vehicle at a given instant, such as, for example, in the case of forceful braking, the central unit 3 calculates the vehicle speed by digital integration of the longitudinal movement acceleration $\gamma_{x-mvt}$ from the overall speed determined for the preceding instant. The vehicle speed at each instant i is then supplied by the formula:

$$V_v(i)=V_v(i-1)+\gamma x_{-mvt}\cdot \Delta t, \tag{f}$$

in which $Vv_{(i)}$ is the vehicle speed estimated at the instant $t_i$; $Vv_{(i-1)}$ is the vehicle speed estimated at the instant $t_{(i-1)}$; $\gamma_{x-mvt}$ is the movement acceleration of the vehicle and $\Delta t$ is the time interval between two successive calculations (or 16 ms as indicated for this example).

Figure 5A:
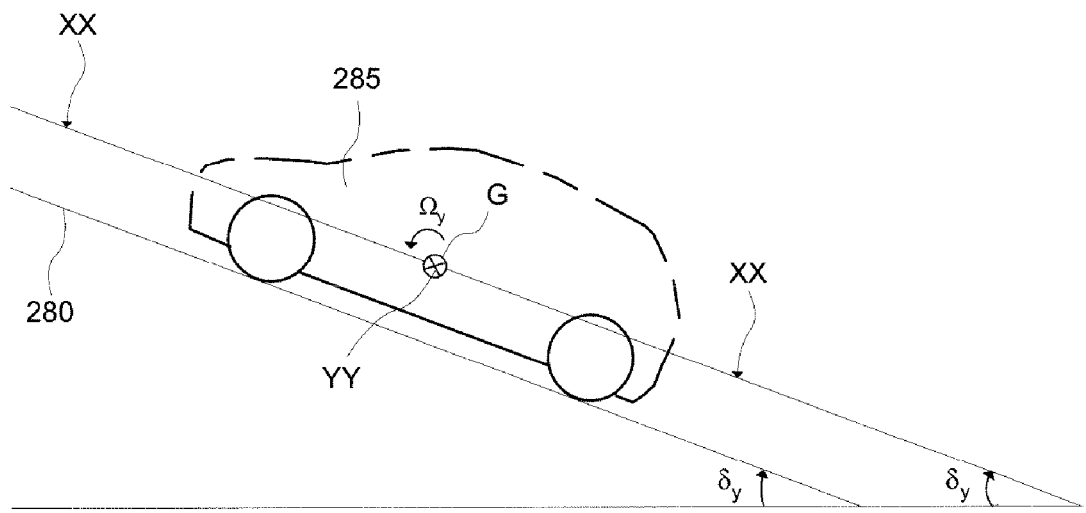
FIGS. 5a and 5b illustrate the explanations regarding the determination of the slope angle of the ground from data measured by the vehicle.
Figure 5B:
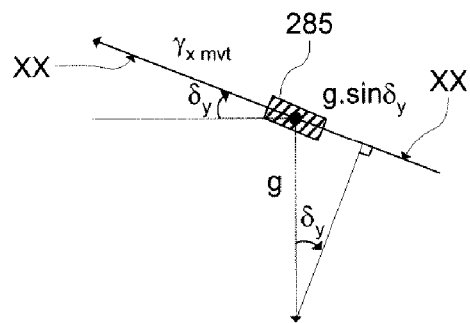

Obviously, it is important to then have a reliable measurement of the vehicle movement acceleration $\gamma_{x-mvt}$. Conventionally, the accelerometer 34 used in the present example is sensitive to the acceleration $\gamma_{x-mes}$ resulting from the forces applied to the vehicle in the direction and the line of its longitudinal displacement. To simplify the explanations, it is assumed that the axis of the accelerometer 34 is oriented parallel to the ground when the vehicle is stopped and the pitch oscillations of the body shell of the vehicle are disregarded initially. If the ground is horizontal, the measurement $\gamma_{x\ mes}$ from the accelerometer 34 truly corresponds to the movement acceleration $\gamma_{x\text{-}mvt}$ of the vehicle. On the other hand, when the ground on which the vehicle is rolling 280 is sloped, forming an angle δ with the horizontal (FIG. 5*a*), the movement acceleration of the vehicle 285 along its displacement axis XX is the resultant of the acceleration $\gamma_{x\ mes}$ measured along this axis XX and the component of the acceleration of gravity g along said displacement axis of the vehicle XX (see FIGS. 5*a* and 5*b*). The value of this component represents a deviation of g·sin δ between the measured acceleration value $\gamma_{x\ mes}$ and the real vehicle movement acceleration value $\gamma_{x\text{-}mvt}$. Thus, for example, a non-compensated slope of 5% induces, on the acceleration measurement, an error of 5% if a braking of 1 g is applied (but 10% if a braking of only 0.5 g is applied) and, on the speed, an error of 7 km/h after 4 s. It is consequently necessary to correct the value $\gamma_{x\text{-}mvt}$ to have a vehicle speed measurement that is acceptable for regulating slip according to the relation:

$$\gamma_{x\text{-}mvt} = \gamma_{x\ mes} - g \cdot \sin \delta y \quad (a)$$

The correction is made by the central unit 3 which consequently requires reliable information concerning the value of the angle δ.

The angle δ can be first accessed by using the measurements obtained from the wheel sensors 11. The central unit 3 calculates a first approximation $\gamma_{x\ wheels}$ of the movement acceleration of the vehicle from the circumferential acceleration values from each wheel $\gamma_r$ which are transmitted to it by the wheel modules 23. The relation (a) hereinabove makes it possible in practice to deduce an estimation of the angle δ according to the formula:

$$\delta_{y\text{-}acc} = \text{Arcsin}\ [(\gamma_{x\ mes} - \gamma_{x\ wheels})/g] \quad (b)$$

Figure 6:
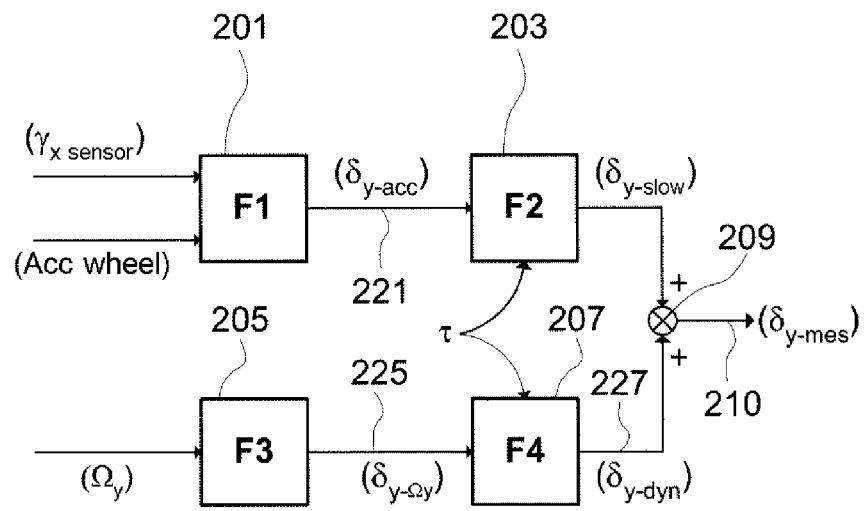
FIG. 6 very schematically illustrates a signal processing stage for correcting slope and acceleration measurements.

This calculation is the subject of a first stage (F1) of digital processing of the signals illustrated by the block 201 in FIG. 6.

Figure 7A:
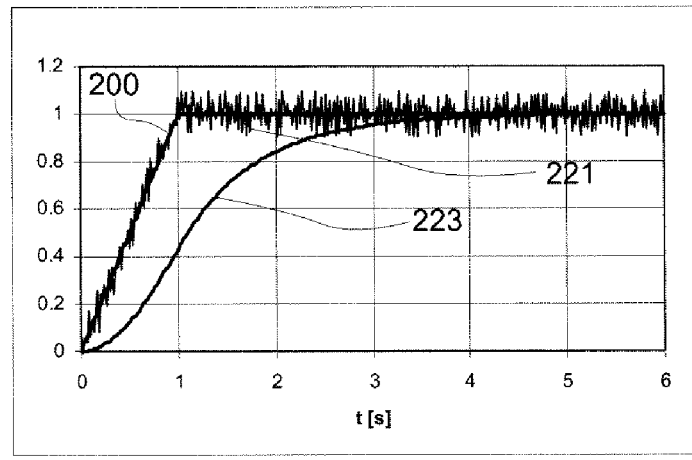
FIGS. 7a, 7b and 7c are diagrams of the signals produced in the signal processing stage of FIG. 6.

In practice, the signal corresponding to this estimation is very noise-affected. It is visible in FIG. 7*a* which represents (graph 200) a diagram of the curve showing the variation 200 as a function of time of the angle $\delta_{\text{-}real}$ from 0 to 1 (arbitrary values) in a change of ground slope and the corresponding variation of the estimation 221 (relation (b)) at the output of the stage F1. An additional step to improve the quality of the measurement consists in applying a low-pass digital filtering (stage F2—block 203) of the digital values deriving from F1. FIG. 7*a* shows the curve of the variation 223 of the signal $\delta_{y\text{-}slow}$ at the output of F2 which is delayed relative to the variation of the angle but offers good accuracy over the long term.

Figure 7B:
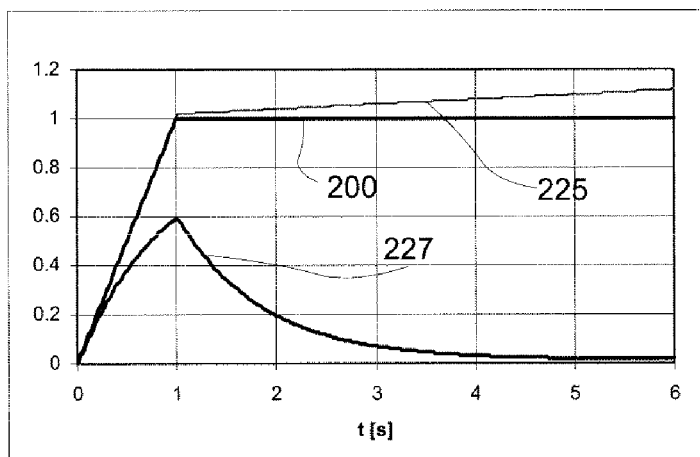
Figure 7C:
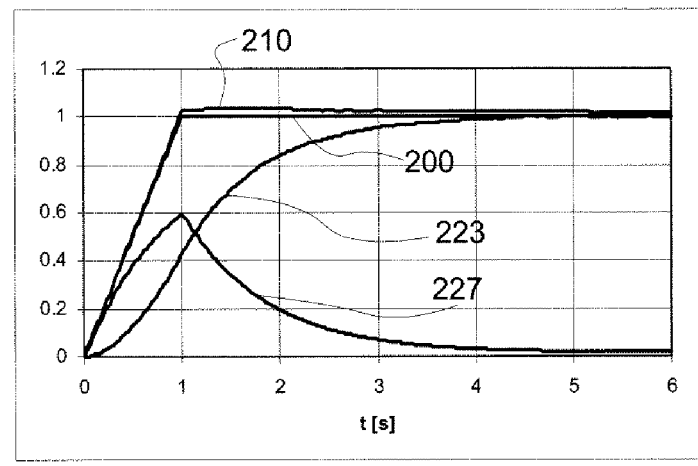

To obtain an improved indication of the angle δ which is both accurate and sufficiently dynamic, the central unit 3 combines the result with another approximation of the angle $\delta_{\text{-}dyn}$ deriving from the measurements from the sensor 38 of the angular speed of the vehicle $\Omega_y$ about the axis YY parallel to the ground and perpendicular to the axis XX of movement of the vehicle. This signal is integrated over time (stage F3, block 205 FIG. 6) to supply an estimation of the variation of the angle δ ($\delta_{y\text{-}\Omega y}$) at the output of F2 represented as 225 in the diagram of FIG. 7*b*. This signal is well-representative of the angle variation sought over the short term but subject to drift over the long term. It is subjected to a high-pass digital filtering (stage F4—block 207—FIG. 6) with the same time constant as the low-pass filtering applied by the stage F2 to supply the digital indication of which the representation 227 can be seen in FIG. 7*b*. The outputs of the stages F2 and F4 (FIG. 6) are aggregated in a stage 209 to supply the compensated indication 210 sought for the angle δ (see curve 210 in the diagram of FIG. 7*c*).

The place of the operations that have just been detailed here in the overall process for determining the overall speed of the vehicle according to the invention is represented by the step 317 in the flow diagram of FIG. 4*a*. Knowing the angle δ with the desired accuracy, the system calculates the movement acceleration as was explained with respect to the relation (a), then the overall vehicle speed is calculated according to the relation (f). The duly calculated overall vehicle speed for the instant concerned is displayed in the step 315, failing a valid determination that would be obtained directly from the wheel signals.

In fact, the slope angle δ is the sum of two components, namely the slope $\delta_1$ of the actual ground on which the vehicle is rolling and the angle $\delta_2$ between the displacement axis of the vehicle XX and the ground as a function of the pitch oscillations of the vehicle about an axis YY. In practice, the calculation and the tests show that the variation of this angle has little impact on the accuracy of the corrections required, bearing in mind that, strictly speaking, the correction could be carried out by calculation according to the preceding principles if the circumstances demand it.

In an exemplary embodiment based on the principles that have just been described in detail, with a vehicle with four driving wheels controlled only by electric machines, that is to say in particular without mechanical braking of the movement, average braking decelerations from 80 km/h to zero km/h of the order of 1 to 1.05 g on dry ground have been obtained. In this embodiment, a single slip set point value has been adopted for all wheels, set at 15%. However, implementing the invention does not preclude adopting more sophisticated control schemes in which the slip set point is varied self-adaptively, for example by observing road grip or any other relevant factor having led to the activation of the slip regulator at the instant concerned, to converge as close as possible with the optimum deceleration of the wheel that makes it possible to retain road grip and good behaviour of the vehicle in the particular rolling conditions of the moment.

Obviously, there are, in practice, other methods for accessing certain data that is necessary for correctly using the measurements made. Thus, for example, the use of an inclinometer on board the vehicle could supply additional measurements to increase the reliability of the instantaneous determination of the angle δ.

There are thus also known techniques for determining the vehicle speed based on a very brief interruption of the torque applied to one or more wheels to obtain a value of the vehicle speed directly from the corresponding wheel sensor. The torque on a wheel system (Av or Ar for example) can be reduced periodically for a few fractions of a second to briefly restore the road grip of a wheel on slippery ground and obtain one or more measurements of the speed $V_r$ which are recognized as valid for obtaining a failed overall speed estimation from which, for example, an integration of the movement acceleration can be pursued in the absence of valid signals originating from the wheel sensors.

It is important to stress the point at which the application of the invention is appropriate to a system such as that retained hereinabove by way of example. Such a vehicle is equipped with four driving wheels that are each coupled to a respective rotary electric machine designed and arranged so that the traction and braking are entirely provided from the torques exerted by this machine on the corresponding wheel, with no mechanical braking. This system in fact provides accurate knowledge at all times of the direction and the intensity of these torques and consequently their accurate control as a function of the slip values calculated to optimize the road grip of each wheel independently and in all circumstances.

The invention can also be applied to vehicles that have only one or two wheels (for example at the front) coupled to a rotary electric machine and one or two non-driving wheels. In this case, the driving wheels can benefit from pure electric braking or electric braking in addition to mechanical braking, the brake control pedal then actuating a sensor in the first part of its travel, via the central unit for purely electric braking on the two front wheels. In the continuation of its travel, the brake pedal acts on a conventional hydraulic circuit to generate additional mechanical braking on the four wheels.

The principle for determining the vehicle speed can be adapted to a speed measurement only on the two wheels equipped with motors (for example at the front). It is also possible to envisage, in this case, as explained above, equipping the rear wheels of the vehicle with only speed sensors in order to also help in generating the indication of vehicle speed relative to the ground. From then on the slip regulator can perfectly well operate on the front wheels in the motive sense (preventing skidding). It can also operate in the braking sense to avoid the cancellation and reversal of the rotation of the wheels in the first part of the travel of the brake pedal where the braking is purely electrical.

Obviously, the invention is not limited to the examples described and represented, and various modifications can be made thereto without departing from its context as defined by the appended claims.

The invention claimed is:

1. A vehicle control system that provides an estimation of an instantaneous speed relative to a ground surface of a vehicle having at least two wheels, each wheel equipped with a wheel sensor for supplying a measurement that is a function of a rotation of the wheel at a given instant, the system comprising:
   (a) for each wheel, a wheel speed indicator for supplying at an instant an indication that is a function of a circumferential wheel speed for the wheel from a measurement of a corresponding wheel sensor of the wheel;
   (b) a vehicle speed indicator for producing a vehicle ground speed estimation at that instant as a function of indications obtained from the wheel speed indicators upon completion of a diagnostic test on a condition of the wheels; and
   (c) a processor programmed to include a validation unit that performs a first test of a road grip condition of each wheel regardless of a state of the ground surface on which the wheel is rolling, based on slip information of the vehicle,
   wherein the vehicle speed indicator operates based on information obtained from the validation unit of the processor to produce an instantaneous vehicle speed estimation from an indication of a circumferential wheel speed of at least one wheel whose road grip condition has been ascertained by the first test performed by the validation unit.

2. The vehicle control system according to claim 1, wherein the slip information data is based on at least one of: a previous estimation of vehicle speed and a road grip coefficient measurement.

3. The vehicle control system according to claim 2, wherein the first test performed by the validation unit is based on at least one of: a slip criterion corresponding to a determined average speed having an error equal to or less than 3% and a road grip coefficient criterion corresponding to a slip value equal to or less than 15%.

4. The vehicle control system according to claim 1, wherein the validation unit performs a second test of a loss of road grip of a wheel, and
wherein the first test is performed on only a wheel or wheels having a positive test result from the second test, indicating no loss of road grip.

5. The vehicle control system according to claim 4, wherein the second test performed by the validation unit detects for a loss of road grip of a wheel being tested from a measurement of an acceleration of the wheel being tested, positive or negative, taken from a corresponding wheel sensor.

6. The vehicle control system according to claim 5, wherein the second test performed by the validation unit detects for a loss of road grip of each wheel as a function of a threshold slip value that is different depending on whether the wheel is subject to an acceleration or a deceleration, to rule out use of data corresponding to a wheel experiencing a loss of road grip.

7. The vehicle control system according to claim 4, wherein the validation unit performs a third test of a validity of indications of a circumferential wheel speed of a wheel to be used in an approximation of vehicle speed, based on a measurement of a road grip coefficient of the wheel, wherein the vehicle speed indicator selectively operates to produce the instantaneous vehicle speed estimation from indications of circumferential wheel speed obtained from only a wheel or wheels having positive test results from at least two of the first, second, and third tests, each of the positive test results indicating a stable or acceptable road grip.

8. The vehicle control system according to claim 7, wherein the third test performed by the validation unit tests for a value of a road grip coefficient of a wheel relative to a first threshold below which a circumferential wheel speed of the wheel under test can be retained as a valid approximation for computation of a ground speed of the vehicle at the given instant.

9. The vehicle control system according to claim 8, wherein the first test performed by the validation unit is based on at least one of: (i) a test of a measurement of the road grip coefficient as a function of a second threshold lower than the first threshold, and (ii) a test of a value of an instantaneous wheel slip rate, calculated from an estimation of vehicle speed at a preceding instant, relative to a predetermined threshold.

10. The vehicle control system according to one of claims 1, 4, 7, or 9, wherein the vehicle control system is incorporated in an electric traction vehicle equipped with at least one wheel coupled to a rotary electric machine for fully and solely driving that wheel in traction and in braking.

11. The vehicle control system according to claim 7, wherein the second test performed by the validation unit detects for a loss of road grip of a wheel being tested from a measurement of an acceleration of the wheel being tested, positive or negative, taken from a corresponding wheel sensor.

12. The vehicle control system according to claim 11, wherein the second test performed by the validation unit detects for a loss of road grip of each wheel as a function of a threshold slip value that is different depending on whether the wheel is subject to an acceleration or a deceleration, to rule out an indication corresponding to a wheel experiencing a loss of road grip.

13. The vehicle control system according to claim 4, wherein the first test of the validation unit ascertains a road grip condition of a wheel by testing if a value of wheel slip calculated based on a previous estimation of vehicle speed is equal or lower than a threshold of about 3%.

14. The vehicle control system according to claim 4, wherein the first test of the validation unit determines a road grip condition of a wheel by testing if a slip value for that wheel is equal to or lower than about 15%.

15. The vehicle control system according to claim 1, wherein the vehicle speed indicator calculates an average value of speed indications obtained by the validation unit for an instant under consideration.

16. The vehicle control system according to claim 1, wherein the processor is programmed to include a diagnosis unit that diagnoses an integrity of at least one of: an operation of the wheel sensors, and a data transmission network of the vehicle, an output of the diagnosis unit being coupled to an input of provided to the validation unit.

17. The vehicle control system according to claim 1, wherein the validation unit computes a road grip coefficient in response to an indication of a torque applied to each wheel under consideration when running and to an indication of a dynamic load of the vehicle on each wheel under consideration.

18. The vehicle control system according to claim 1, further comprising a turn-radius sensor that supplies to the validation unit and the vehicle speed indicator an indication as a function of an instantaneous turn radius of the vehicle in a turn operation to produce an indication of the circumferential wheel speed of each wheel corrected as a function of the turn radius of the vehicle and of a position of that wheel in the turn operation.

19. A vehicle control system for controlling a vehicle having at least two wheels, based on an indication of an instantaneous slip of at least one wheel subject to at least one of: a traction torque and a braking torque when running, the vehicle control system comprising:

for each wheel, a wheel sensor for supplying a measurement that is a function of a rotation of the wheel at a given instant;

for each wheel, a wheel speed indicator for supplying an instantaneous indication of a quantity as a function of a circumferential wheel speed for the wheel based on a measurement from a corresponding wheel sensor;

a vehicle speed indicator for producing an instantaneous vehicle ground speed estimation as a function of indications obtained from the wheel speed indicators upon completion of a diagnostic test on a condition of the wheels; and a processor programmed to include a validation unit and a computation unit, wherein the validation unit performs a first test of a road grip condition of each wheel regardless of a state of a ground surface on which the wheel is rolling, based on slip information of the vehicle, wherein the vehicle speed indicator operates based on information obtained from the validation unit to produce an instantaneous vehicle speed estimation from an indication of a circumferential wheel speed of at least one wheel whose road grip condition has been ascertained by the first test, and wherein the computation unit operates in response to data from the wheel speed indicators and the vehicle speed indicator at a given instant to supply an indication of a slip of each of the wheels as a function of a difference between the circumferential wheel speed of the wheel and the vehicle ground speed estimation.

* * * * *

UNITED STATES PATENT AND TRADEMARK OFFICE
CERTIFICATE OF CORRECTION

PATENT NO.        : 8,527,177 B2
APPLICATION NO.   : 12/739875
DATED             : September 3, 2013
INVENTOR(S)       : Jean-Louis Linda et al.

Page 1 of 1

It is certified that error appears in the above-identified patent and that said Letters Patent is hereby corrected as shown below:

In the Specification

COLUMN 9

Line 57, "speed Ω-y" should read --speed $_{\Omega\text{-y}}$--.

COLUMN 14

Line 21, "pr" should read --µr--.

Line 39, "pr" should read --µr--.

Line 43, "slip X" should read --skip λ--.

Line 44, "pr" should read --µr--.

COLUMN 15

Line 38, "front (Av) and rear (Ar)" should read --front $(_{Av})$ and rear $(_{Ar})$--.

COLUMN 16

Line 17, "t" should read --µ--.

COLUMN 18

Line 51, "(Av or Ar for example)" should read --($_{Av}$ or $_{Ar}$ for example)--.

In the Claims

COLUMN 21

Line 2, "equal" should read --equal to--.

Line 17, "of" should be deleted.

Signed and Sealed this
First Day of September, 2015

Michelle K. Lee
*Director of the United States Patent and Trademark Office*